United States Patent
Missou et al.

(10) Patent No.: US 10,486,824 B2
(45) Date of Patent: Nov. 26, 2019

(54) METHOD FOR CONTROLLING A FUEL TANK INERTING SYSTEM AND AN INERTING SYSTEM FOR CARRYING OUT THE METHOD

(71) Applicant: Zodiac Aerotechnics, Roche la Moliere (FR)

(72) Inventors: Jeremie Missou, Saint Etienne (FR); Olivier Vandroux, Grenoble (FR)

(73) Assignee: Zodiac Aerotechnics, Roche la Moliere (FR)

( * ) Notice: Subject to any disclaimer, the term of this patent is extended or adjusted under 35 U.S.C. 154(b) by 153 days.

(21) Appl. No.: 15/654,796

(22) Filed: Jul. 20, 2017

(65) Prior Publication Data
US 2018/0044032 A1 Feb. 15, 2018

(30) Foreign Application Priority Data

Aug. 12, 2016 (FR) ..................... 16 57758

(51) Int. Cl.
*B64D 37/32* (2006.01)
*G05D 7/06* (2006.01)
*A62C 3/06* (2006.01)
*A62C 3/08* (2006.01)
*A62C 99/00* (2010.01)
*B64D 37/02* (2006.01)

(52) U.S. Cl.
CPC .............. *B64D 37/32* (2013.01); *A62C 3/065* (2013.01); *A62C 3/08* (2013.01); *A62C 99/0018* (2013.01); *G05D 7/0676* (2013.01); *B64D 37/02* (2013.01)

(58) Field of Classification Search
CPC ...... B64D 37/32; B64D 37/02; G05D 7/0676; A62C 3/08; A62C 99/0018; A62C 3/065

USPC ............................................................. 701/3
See application file for complete search history.

(56) References Cited

U.S. PATENT DOCUMENTS

| | | | |
|---|---|---|---|
| 3,400,471 A * | 9/1968 | Papin ...................... | G09B 9/46 434/33 |
| 8,801,831 B1 | 8/2014 | Snow, Jr. et al. | |

(Continued)

FOREIGN PATENT DOCUMENTS

| | | |
|---|---|---|
| EP | 3037353 | 6/2016 |
| FR | 3012421 | 5/2015 |

OTHER PUBLICATIONS

Republique Francaise, Rapport De Recherche Preliminaire for Corresponding French Patent Application No. 1657758 (6 pgs).

*Primary Examiner* — Muhammad Shafi
(74) *Attorney, Agent, or Firm* — Harris Beach PLLC

(57) ABSTRACT

A method for controlling an inerting system designed to inject a flow of inert gas into a fuel tank of an aircraft during a mission. The method includes: determining a value of a parameter of the mission of the aircraft at a given moment; determining the ratio between the determined value of the mission parameter and a value at the given moment of an equivalent parameter of a standard mission profile, and deducing a weight coefficient therefrom; using the weight coefficient to weight a value of the inert gas flow rate recommended by the standard mission profile for the value of the equivalent parameter at the given moment so that an appropriate inert gas flow rate to be injected is determined for the needs of the mission at the given moment; and commanding the inerting system to inject the inert gas flow rate determined at the given moment.

7 Claims, 1 Drawing Sheet

(56) References Cited

U.S. PATENT DOCUMENTS

2006/0021652 A1    2/2006  Surawski
2016/0176535 A1*   6/2016  Family ................... B64D 37/32
                                                           701/3

* cited by examiner

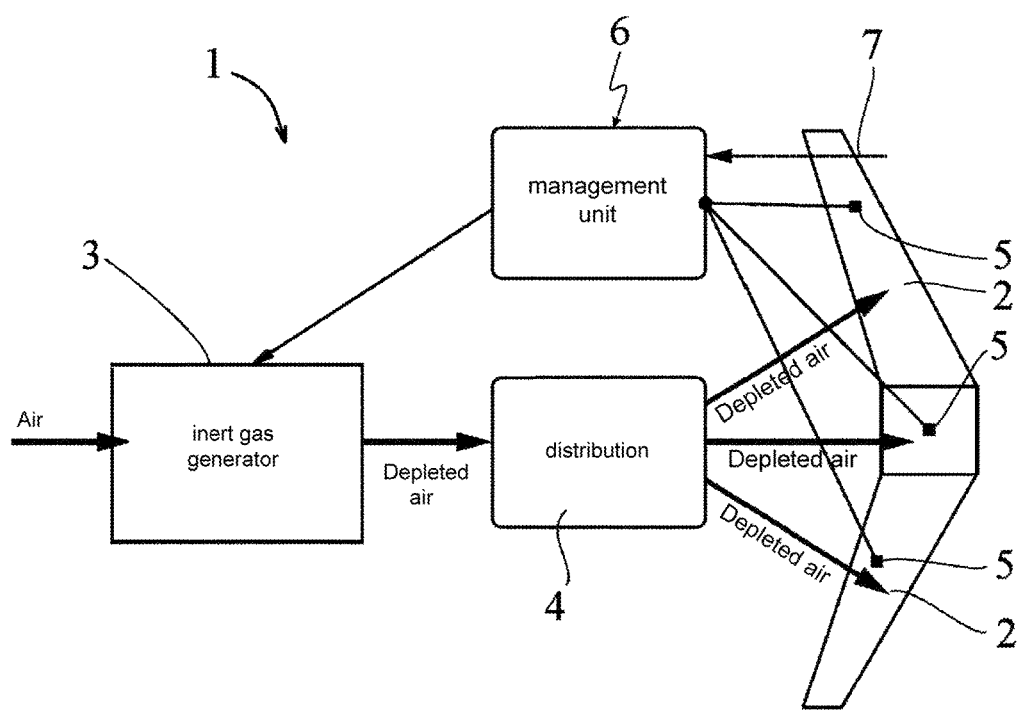

METHOD FOR CONTROLLING A FUEL TANK INERTING SYSTEM AND AN INERTING SYSTEM FOR CARRYING OUT THE METHOD

CROSS-REFERENCE to RELATED APPLICATIONS

This application claims the benefit of French Patent Application No. 1657758, filed on Aug. 12, 2016. The entirety of this application is incorporated herein by reference.

TECHNICAL FIELD

The present invention relates to a method for controlling an aircraft fuel tank inerting system such as on an airplane, a helicopter or similar as well as an inerting system for carrying out the said method.

PRIOR ART

In the art of aeronautics inerting systems are known for the generation of an inert gas such as nitrogen or any other inert gas such as carbon dioxide, and for introducing said inert gas into fuel tanks for safety reasons, that is, to reduce the risk of explosion from said tanks.

A conventional, prior art inerting system typically includes an on board inert gas generating system (OBIGGS) supplied with compressed air, for example, with compressed air diverted from at least one engine from a so-called intermediate pressure stage and/or a so-called high pressure stage based on a flight situation. It should be noted that the use of compressed air from an engine is advantageous because it has a relatively high pressure and temperature so the air can be adjusted to a wide range of desired pressure and temperature settings. The OBIGGS is connected to the airplane fuel tank and separates oxygen from the air.

The OBIGGS is composed of at least one air separating module containing, for example, permeable membranes such as polymer membranes passed over by an air flow. Due to the different permeabilities of the membrane to nitrogen and oxygen, the system splits the air flow so that an air flow with high nitrogen content and an air flow with high oxygen content are obtained. The air fraction enriched with nitrogen, considered to be the inert gas, is routed into fuel tanks so that the oxygen level present in free volume of the tank is decreased. The devices required for this process such as compressors, filters, and air or water cooling modules or similar are integrated into the inerting system.

When the oxygen ratio in the empty part of the tank is below the ignition limit defined in accordance with the Federal Aviation Administration (FAA) requirements detailed in AC25.981-2A dated Sep. 19, 2008 entitled "FUEL TANK FLAMMABILITY REDUCTION MEANS" and its appendices, the ignition and deflagration risks are very low or even nonexistent. From the foregoing, inerting a fuel tank is composed of injecting an inert gas into the tank in order to maintain the level of oxygen present in said tank below a certain threshold, for example 12%.

The inerting system is therefore produced according to the dimensioning rules mandated by document AC25.981-2A. The flow rate of the inert gas to be injected is therefore determined at regular intervals as a function of the values of parameters of a certified standard mission profile. The certified standard mission profile corresponds to the mission profile most frequently adopted by the aircraft. For example, these parameters may be a free volume of the fuel tank, or the rate of descent and/or climb and/or the altitude of the aircraft. The certified standard mission profile recommends injecting a certain inert gas flow rate for parameter values at a given moment in order to satisfy the regulations in force.

However, the certified standard mission profile provides, inter alia, for the aircraft to perform a descent during its mission at a rate of 2500 feet per minute to an altitude of 4000 feet, and that the aircraft loads a sufficient quantity of fuel into its tanks for it to land with a predetermined minimum quantity of fuel. The certified standard mission profile is composed of parameters that are generally more restrictive than those observed in reality during a real mission of the aircraft.

As a result, the state of the art inerting system is generally oversized compared to the real need for inert gas during a standard flight, and generates and injects a larger volume of inert gas than necessary, indirectly causing excess fuel consumption by the aircraft and high operating costs.

DISCLOSURE OF THE INVENTION

One of the aims of the invention is therefore to resolve these drawbacks by proposing a method for controlling an inerting system of an aircraft fuel tank, making it possible to adapt the distribution of inert gas to the real needs so as to indirectly reduce the fuel consumption and the cost of operating the inerting system.

To this end and according to the invention, a method for controlling an inerting system is proposed that is designed to inject a flow of inert gas into at least one of the aircraft's fuel tanks during a real mission.

According to the invention, the control method involves carrying out the following steps:
  determining a value of at least one parameter of the real mission of the aircraft at a given moment;
  determining the ratio between the determined value of the real mission parameter and a value of an equivalent parameter of a certified standard mission profile at the given moment and deducing a weight coefficient therefrom;
  using the weight coefficient to weight a value of the inert gas flow rate recommended by the certified standard mission profile for the value of the equivalent parameter at the given moment so that an appropriate inert gas flow rate to be injected is determined for the real needs of the mission at the given moment;
  commanding the inerting system to inject the determined inert gas flow rate at the given moment.

Consequently, the control method allows the inerting system to inject an inert gas flow rate appropriate to the real mission needs of the aircraft at a given moment. Indeed, if the value of the real mission parameter is "n" times smaller than the value of the equivalent parameter of the certified standard mission profile, the inerting system injects a flow rate "n" times smaller than that recommended by the certified standard mission profile to satisfy the regulations in force. Therefore, given that the real need for inert gas is "n" times lower, the inerting system always satisfies the regulations in force.

For example, the parameters of the real mission and the certified standard mission profile are composed of rates of descent and/or climb and/or the altitude of the aircraft or of a free volume in the fuel tank.

Indeed, the inerting system is theoretically dimensioned to be capable of making a fuel tank inert based on a certified standard mission profile of the aircraft, which sets, inter alia, the aircraft's descent during the aircraft's mission at a rate of 2500 feet per minute to an altitude of 4000 feet. Yet in practice, a rate of descent around 1250 feet per minute is observed. In other words, the inerting system has twice as much time to inject inert gas into the fuel tanks. Based on the measurement of this parameter, the invention makes it possible to inject gas with a flow rate half that recommended by the certified standard mission profile and mandated by the regulations in force. In injecting half as much inert gas, the regulations in force are still satisfied, and the inert gas is injected based on the real need, generating savings compared to the recommendation of the certified standard mission profile.

The same reasoning can be applied to the parameter of the free volume of the fuel tank. Indeed, the standard in force and the certified standard mission profile state that the aircraft carries a sufficient quantity of fuel in its tanks for it to land with a predetermined minimum quantity of fuel, for example, corresponding to a so-called reserve quantity. However, this is not always the case. Indeed, some aircraft carry fuel for several missions, for example, either because fuel is less expensive in the takeoff location so that it is less expensive to carry fuel than to buy it upon arrival, or because on arrival, the time needed to fill the tanks requires excessive immobilization of the aircraft.

Therefore, some airplanes carry more fuel than necessary for the mission in progress so the free volume of the reservoir to be inerted is smaller than the forecasts of the certified standard mission profile, and so the inerting flow rate required is lower than the recommended rate. For example, if at a given moment the tank comprises more fuel than stated in the certified standard mission profile, and the free volume to be inerted is half the recommended volume, the method according to the invention will make it possible to divide the recommended inert gas flow rate in half to inject a suitable flow rate for the real need.

The steps of the method are carried out at regular intervals, for example, every few minutes, and preferably about every minute. This frequency makes it possible to practically readjust the inert gas flow rate to the real need in real time while not being influenced by the nonlinear variation of the inert gas needs based on the altitude of the aircraft. Indeed, given that the atmospheric pressure varies based on the altitude nonlinearly, the inert gas needs are not linear over the aircraft's entire descent or climb phase.

The invention also provides an inerting system designed to inject an inert gas flow into at least one fuel tank of an aircraft during a real mission. The inerting system is suitable for carrying out the aforementioned control method, and is composed of at least one inert gas generator supplied with compressed air and suitable for regulating the inert gas flow to be injected. The inerting system is remarkable in that it comprises a method for determining a parameter of the real mission of the aircraft at a given moment connected to a management unit. The management unit is programmed to send a flow rate regulation instruction to the inert gas generator at the given moment. The flow rate regulation instruction corresponds to a value of an inert gas flow rate recommended by a certified standard mission profile for a value of a parameter equivalent to the certified standard mission profile at the given moment, weighted by a coefficient corresponding to the result of a ratio between the value of the determined parameter of the real mission and the value of the equivalent parameter according to the certified standard mission profile.

BRIEF DESCRIPTION OF FIGURES

Other features and advantages will be clearer from the following description provided as a non-limiting example of the method for controlling an aircraft's fuel tank inerting system according to the invention only using FIG. 1 which schematically illustrates an inerting system for carrying out said method according to the invention.

DETAILED DESCRIPTION OF THE INVENTION

FIG. 1 shows an inerting system (1) intended to inject an inert gas flow into at least one fuel tank (2) of an aircraft during a real mission.

The inerting system (1) is composed of at least one inert gas generator (3) supplied with compressed air and suitable for regulating the inert gas flow to be injected. The inert gas generator (3) includes an outlet for oxygen-depleted air regarded as the inert gas. The inert gas generator (3) may be composed of any inert gas generator (3) well known to a person skilled in the art such as a generator with a polymer or zeolite separating membrane and/or a fuel cell, for example.

Next, the inert gas is conveyed toward a means (4) for distributing the inert gas for injection into the fuel tank(s) (2) of the aircraft. The distribution means (4) are well known and are composed of distribution pipes and valves. For example, injection into the tank is carried out using injection nozzles.

Therefore, the inerting system (1) allows an inert gas to be generated and injected into the aircraft fuel tank(s) (2) in order to reduce the risk of explosion from said tanks (2) for safety reasons. The purpose of the injected inert gas is to render the fuel tank(s) (2) inert i.e. allows the level of oxygen present within said tank(s) (2) to be reduced, and notably to maintain this level below a certain threshold, for example, less than 12%.

Furthermore, the inerting system (1) is composed of means (5, 7) for determining a real mission parameter of the aircraft, which is connected to a management unit (6). For example, the parameters determined are composed of rates of climb and/or descent and/or the altitude of the aircraft and/or by the free volume of the fuel tank to be inerted. The means of determination (5, 7) can be of any type. This may involve a variometer (7) or a barometer to measure the variation of atmospheric pressure and to determine the rate of descent or climb or the altitude of the aircraft, and/or a fuel gauging system (5) positioned in the tank to indicate the volume of fuel and indirectly determine the free volume of the tank to be inerted. The parameters of the real mission are determined at regular intervals, for example, every few minutes and preferably about every minute.

For example, based on the parameters of the real mission determined, the management unit (6) is programmed to send a flow rate regulation instruction to the inert gas generator (3) adapted to the real inert gas need of the tank every minute.

For this purpose, the management unit (6) is connected to the inert gas generator (3) and comprises a database in which a certified standard mission profile is saved. This certified standard mission profile corresponds to the mission profile, i.e., the standard flight most frequently performed by the aircraft. The certified standard mission profile indicates the following type of parameters: free volume of the fuel tank, or indirectly, quantity of fuel in the tanks; flight duration; altitude, duration and rate of the climb phase; duration of the cruising phase; duration and rate of descent phase; speed of the aircraft, etc.

According to the regulations in force, the certified standard mission profile recommends an inert gas flow rate to be respected based on the parameters of the standard mission. For example, the database of the management unit (6) is composed of a table and/or equations indicating the inert gas flow rate based on the altitude, the flight time, and the mission phase. In practice, this flow rate table of the standard mission profile is developed during the development phase of the inerting system (1) by analysis. The certified standard mission profile deliberately comprises more restrictive parameters than those of the real mission performed so that the inert gas flow rate recommended by the certified standard mission profile always makes it possible to satisfy the regulations in force. For example, the certified standard mission profile states that the aircraft carries a small quantity of fuel so that it can land using only a predetermined minimum quantity of fuel, for example, corresponding to a so-called reserve quantity. Furthermore, the rates of climb and descent of about 2500 feet per minute set out by the standard mission are too high compared to reality.

The management unit (6) comprises calculation methods programmed to determine a ratio between the value of one of the parameters of the real mission determined at a given moment and the value of a saved equivalent parameter of the certified standard mission profile at the given moment in order to deduce a weight coefficient therefrom.

The computing means of the management unit (6) then weight the value of the inert gas flow rate recommended by the certified standard mission profile for the equivalent parameter of the certified standard mission profile at the given moment using the weight coefficient to deduce an inert gas flow rate therefrom suitable for the real need at the given moment.

At the given moment the management unit (6) sends the inert gas generator (3) an inert gas flow rate regulation instruction appropriate to the real need.

These operations are carried out at regular intervals, for example, every few minutes and preferably about every minute.

Therefore, the management unit (6), which for example assumes the form of a controller run by software, compares one or several parameters of the real mission with those of the certified standard mission profile regularly and adjusts the inert gas flow rate accordingly.

For example, if the comparison of the parameter related to the rate of descent indicates that the aircraft is descending half as quickly as stated in the certified standard mission profile, the management unit (6) commands the inert gas generator (2) to generate a flow rate with half the value of that recommended by the standard mission profile. Indeed, if the aircraft descends at half the speed, the inerting system (1) has twice as much time to inert the tank (2) so that if it injects gas at half the flow rate, the regulations in force will still be satisfied while saving energy and, indirectly, fuel. Indeed, by following the certified standard mission profile, the generator would have sent 100% of the inert gas flow rate throughout the entire duration of the descent instead of 50% of the flow rate according to the present invention.

The same is true for the comparison of the parameter of the free volume of the tank (2) to be inerted. Indeed, if the free volume of the tank (2) is half of the free volume set out by the standard mission, the management unit (6) will command the inert gas generator (3) to send half the flow rate that was recommended.

Of course, several parameters can be compared at the same time. Indeed, if the aircraft descends at half the speed of the saved standard mission and the free volume in the fuel tank (2) is twice as small, the inert gas flow rate is divided by four compared to the recommended inert gas flow rate. The weight coefficients determined are multiplied by one another.

The invention claimed is:

1. A method for controlling an inerting system designed to inject an inert gas flow rate into at least one fuel tank of an aircraft during a real mission of said aircraft, wherein the method comprises the following steps:
    determining a value of at least one parameter of the real mission of the aircraft at a given moment;
    determining the ratio between the determined value of the real mission parameter and a value at the given moment of an equivalent parameter of a certified standard mission profile, and deducing a weight coefficient therefrom;
    using the weight coefficient to weight a value of the inert gas flow rate recommended by the certified standard mission profile for the value of the equivalent parameter at the given moment so that an appropriate inert gas flow rate to be injected is determined for the real needs of the mission at the given moment; and
    commanding the inerting system to inject the inert gas flow rate determined at the given moment.

2. The method according to claim 1, wherein the parameters of the real mission and the certified standard mission profile are composed of the rate of descent and/or climb and/or an altitude of the aircraft.

3. The method according to claim 1, wherein the parameters of the real mission and of the certified standard mission profile are composed of a free volume of the fuel tank.

4. The method according to claim 1, wherein the steps are carried out at regular time intervals.

5. An inerting system intended to inject an inert gas flow into at least one fuel tank of an aircraft during an real mission, said system comprises at least one inert gas generator supplied with compressed air and suitable for regulating the inert gas flow to be injected, wherein the inerting system is composed of means for determining a parameter of the real mission of the aircraft at a given moment connected to a management unit, the management unit being programmed to send, at the given moment, a flow rate regulation instruction to the inert gas generator, the flow rate regulation instruction corresponds to a value of an inert gas flow rate recommended by a certified standard mission profile for a value of an equivalent parameter of the certified standard mission profile at the given moment, weighted by a coefficient corresponding to the result of the ratio between the value of the determined parameter of the real mission and the value of the equivalent parameter of the certified standard mission profile.

6. The inerting system according to claim 5, wherein the parameters of the real mission and the certified standard mission profile are comprised of the rate of descent and/or climb and/or an altitude of the aircraft.

7. The inerting system according to claim 5, wherein the parameters of the real mission and of the certified standard mission profile are comprised of a free volume of the fuel tank.

* * * * *